US010689099B2

(12) United States Patent
Häufle et al.

(10) Patent No.: US 10,689,099 B2
(45) Date of Patent: Jun. 23, 2020

(54) LOCKING DEVICE OF AN AIRCRAFT LANDING GEAR

(71) Applicant: Liebherr-Aerospace Lindenberg GmbH, Lindenberg/Allgäu (DE)

(72) Inventors: Stephan Häufle, Langenargen (DE); Torsten Blöß, Wangen (DE); Markus Jocham, Amtzell (DE)

(73) Assignee: Liebherr-Aerospace Lindenberg GmbH, Lindenberg/Allgau (DE)

( * ) Notice: Subject to any disclaimer, the term of this patent is extended or adjusted under 35 U.S.C. 154(b) by 528 days.

(21) Appl. No.: 15/158,948

(22) Filed: May 19, 2016

(65) Prior Publication Data

US 2016/0340031 A1    Nov. 24, 2016

(30) Foreign Application Priority Data

May 19, 2015 (DE) .................... 20 2015 003 619 U

(51) Int. Cl.
*B64C 25/26* (2006.01)
*B64C 25/24* (2006.01)
*B64D 45/00* (2006.01)

(52) U.S. Cl.
CPC .............. *B64C 25/26* (2013.01); *B64C 25/24* (2013.01); *B64D 45/00* (2013.01)

(58) Field of Classification Search
CPC .......... B64C 25/24; B64C 25/26; B64D 45/00
See application file for complete search history.

(56) References Cited

U.S. PATENT DOCUMENTS

| 2,132,682 | A | * | 10/1938 | Dowty | B64C 25/14 188/1.12 |
| 2,349,244 | A | * | 5/1944 | Brown | B64C 25/22 188/300 |
| 2,360,535 | A | * | 10/1944 | Ashton | F15B 15/261 244/102 SL |
| 2,508,351 | A | * | 5/1950 | Bjerke | B64C 25/505 244/103 R |
| 3,361,390 | A | * | 1/1968 | Wilkes | B64C 25/04 16/35 R |
| 3,652,039 | A | * | 3/1972 | Lucien | B64C 25/16 137/625.69 |
| 5,022,609 | A | * | 6/1991 | Cranston | B64C 25/12 244/102 R |
| 5,025,627 | A | * | 6/1991 | Schneider | F03G 7/06 60/527 |
| 5,288,037 | A | * | 2/1994 | Derrien | B64C 25/26 244/102 SL |
| 5,333,816 | A | * | 8/1994 | Del Monte | B64C 25/50 244/102 R |

(Continued)

FOREIGN PATENT DOCUMENTS

CA    2576801 A1    3/2006
JP    2002327712 A    11/2015

(Continued)

*Primary Examiner* — Medhat Badawi
(74) *Attorney, Agent, or Firm* — Arent Fox LLP

(57) ABSTRACT

A locking device of an aircraft landing gear for locking the landing gear in a retracted and an extended position. A locking cylinder is arranged on a landing gear leg and a locking bolt is movably arranged in the locking cylinder. In the retracted position and in the extended position of the landing gear the locking bolt serves to fix the landing gear leg.

10 Claims, 4 Drawing Sheets

(56) References Cited

U.S. PATENT DOCUMENTS

Figure 1:
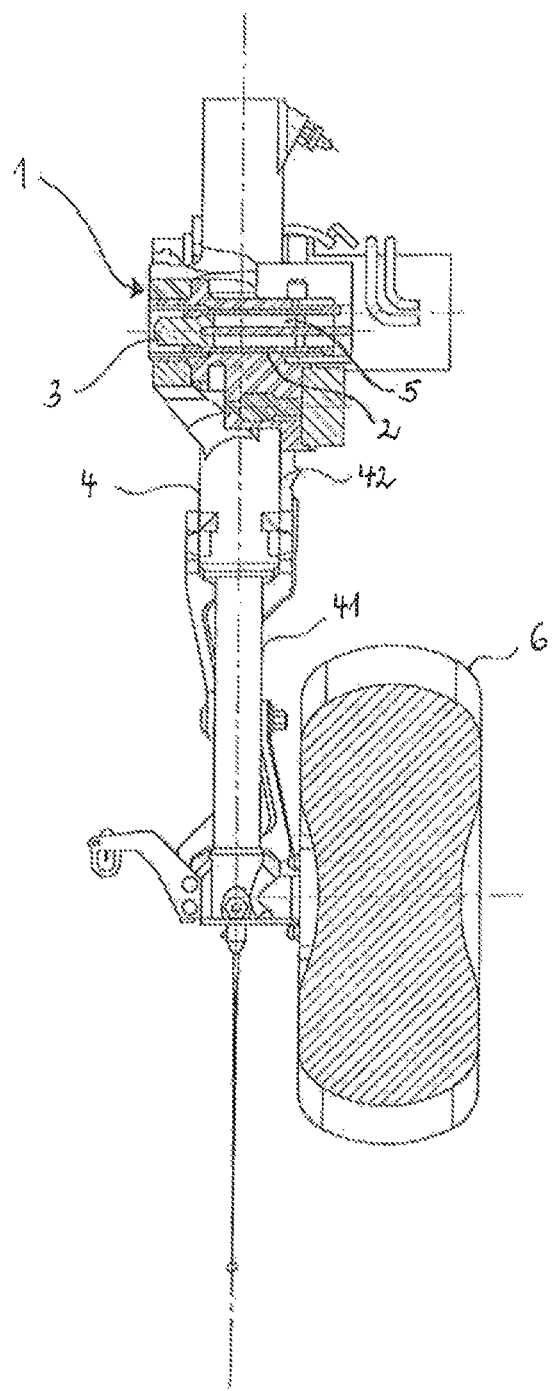

| | | | | | |
|---|---|---|---|---|---|
| 5,685,149 A | * | 11/1997 | Schneider | | F03G 7/06 250/573 |
| 6,192,684 B1 | * | 2/2001 | McBirney | | F15B 11/028 60/527 |
| 6,811,118 B2 | * | 11/2004 | Collet | | B64C 25/26 244/102 A |
| 7,098,619 B2 | * | 8/2006 | Stridsberg | | B64C 13/00 318/563 |
| 8,061,654 B2 | * | 11/2011 | Meyer | | B64C 25/26 244/102 A |
| 8,814,094 B2 | * | 8/2014 | Tran | | B64C 25/26 244/100 R |
| 2006/0163426 A1 | | 7/2006 | Smith, III | | B64C 25/26 244/102 R |
| 2009/0071207 A1 | * | 3/2009 | Meyer | | B64C 25/26 70/262 |
| 2009/0145417 A1 | * | 6/2009 | Taack-Trakranen | | B25H 1/0042 125/36 |
| 2009/0250552 A1 | * | 10/2009 | Kearns | | B64C 25/24 244/102 A |
| 2009/0283634 A1 | * | 11/2009 | Tran | | B64C 25/26 244/102 A |
| 2011/0024557 A1 | * | 2/2011 | Brighton | | B64C 25/20 244/102 SL |
| 2011/0056197 A1 | * | 3/2011 | Schmidt | | B64C 25/26 60/527 |
| 2011/0278394 A1 | * | 11/2011 | Ditzler | | B64C 25/26 244/102 SL |
| 2012/0037752 A1 | * | 2/2012 | Collins | | B64C 25/26 244/102 SL |
| 2012/0187239 A1 | * | 7/2012 | Martin | | B64C 25/26 244/50 |
| 2016/0280360 A1 | * | 9/2016 | Glas | | B64C 25/50 |
| 2016/0340031 A1 | * | 11/2016 | Haufle | | B64C 25/26 |

FOREIGN PATENT DOCUMENTS

| | | |
|---|---|---|
| WO | WO 2009/079785 A | 7/2009 |
| WO | WO 2009/150376 A2 | 12/2009 |

* cited by examiner

LOCKING DEVICE OF AN AIRCRAFT LANDING GEAR

CROSS-REFERENCE TO RELATED APPLICATIONS

The present application claims priority to German Patent Application No. 20 2015 003 619.8 filed May 19, 2015, the entire contents of which are incorporated herein by reference.

FIELD OF THE INVENTION

The present invention relates to a locking device of an aircraft landing gear.

BACKGROUND OF THE INVENTION

Typically, landing gears of aircraft, in particular of airplanes, but also in helicopters, are extended out of an aircraft main body for a landing or takeoff operation. In a flight phase, however, the landing gear is retracted, in order to minimize the air resistance.

According to the prior art, the landing gear is locked in its extended condition via a drag brace. This drag brace prevents the unwanted retraction of the landing gear when a force is applied, in addition, the drag brace serves for transmitting the forces acting on the landing gear during a takeoff or landing phase. The locking device of the landing gear in an extended condition also analogously is referred to as "downlock".

In a retracted condition, the landing gear is retained via a so-called "uplock". For example, such uplock device comprises a hook which catches a bolt attached to the landing gear and prevents an extension of the landing gear.

The uplock and downlock device of a conventional aircraft landing gear requires a multitude of components and a certain installation space. In addition, the total weight of the aircraft also is increased by the components, which in turn leads to an increased fuel consumption of the aircraft.

SUMMARY OF THE INVENTION

It is an objective of the present invention to create a locking device which overcomes the aforementioned problems.

This is achieved with a locking device of an aircraft landing gear with the features of present claim 1.

Accordingly, the inventive locking device of an aircraft landing gear for locking the landing gear in a retracted and an extended position comprises a locking cylinder which is arranged on a landing gear leg and a locking bolt which is movably arranged in the lacking cylinder. In the retracted position and in the extended position of the landing gear the locking bolt serves to fix or secure the landing gear leg.

The locking cylinder is equipped such that the locking bolt accommodated therein can completely be pushed into the locking cylinder or also can protrude out of the same. The locking bolt accordingly is movably arranged in the locking cylinder. As both in a retracted condition of the landing gear in an extended condition of the landing gear the locking bolt serves to fix the landing gear leg, it no longer is necessary to provide two separate units for fixing the landing gear leg in a retracted condition (uplock) and for fixing the landing gear leg in an extended condition (downlock). Both the uplock and the downlock are realized by means of the locking bolt movably arranged in the locking cylinder.

With the invention it hence is possible to replace the conventionally used drag brace for fixing the extended landing gear leg and the uplock with which the retracted landing gear is fixed at the aircraft main body. At the same time, the positioning of the locking device on the landing gear leg reduces the necessary installation space as well as the number of the necessary components which so far have been necessary for the uplock and downlock. The total weight necessary also is reduced thereby, so that a saving can be achieved in operation of the aircraft provided with the locking device according to the invention.

Preferably, the locking bolt is movably arranged in the locking cylinder transversely to the longitudinal direction of the landing gear leg. For example, the landing gear leg has a linearly extending shape, wherein the locking bolt is aligned vertically to this shape and also can be moved vertically thereto. By extending the locking bolt out of the locking cylinder, the movement of the landing gear leg, which is executed for transitioning between a retracted and an extended condition, is prevented. By moving the locking bolt transversely to the longitudinal direction of the landing gear leg, it is particularly easily possible to fix and to secure the landing gear leg.

According to a further advantageous modification of the invention the locking bolt in a condition extended out of the locking cylinder is designed to fix the landing gear leg.

For example, in a retracted condition of the landing gear the locking bolt engages into a receptacle provided for this purpose, which prevents an extension of the landing gear.

This also comprises the extended condition of the landing gear leg, for whose stabilization or fixation the locking piston is extended out of the locking cylinder, in order to cooperate with a connecting point.

Preferably, the present device comprises a connecting point for interacting or engaging with the locking piston extended out of the locking cylinder, in order fix the landing gear leg in a retracted or an extended condition.

Preferably, the connecting point is a sleeve for accommodating the locking piston extended out of the locking cylinder. However, it is conceivable just as well that the connecting point is a form other than a sleeve surrounding the locking piston.

According to another advantageous, optional development of the invention the locking bolt is pretensioned by an elastic element, preferably a spring or the like.

Preferably, pretensioning the locking bolt is performed by two springs independent of each other. This prevents a system failure of the device according to the invention in the case of the failure of one spring. Thus, when one of the at least two independent springs breaks, pretensioning the locking bolt is performed by the other, still intact spring. Due to the redundancy of the springs, the failure probability of the locking device is reduced.

It is advantageous when the spring pretensioning force of the locking piston urges the locking piston in a direction out of the locking cylinder. This is advantageous, as in the case of a failure of the moving mechanism for moving the locking piston into the cylinder or out of the same, the piston is urged to the outside by the spring pretensioning force and thus cannot be moved out of a fixed and secured condition. As a result, there is no risk that a landing gear leg extended already will buckle under force application in the case of a damaged moving mechanism of the locking piston and leads to an uncontrollable takeoff or landing phase of an aircraft.

According to the invention, it is advantageous that the fixed or secured condition of the landing gear leg is present with an extended locking bolt.

According to an advantageous development of the invention the device furthermore comprises a motor, preferably an electric motor, for moving the locking piston in the locking cylinder. The electric motor can be coupled with the locking piston via a transmission, in order to for example convert a rotatory movement of the motor into a linear movement.

In addition, the device according to the invention furthermore can include a switch for monitoring a position of movement of the locking piston.

Preferably, the device comprises at least two switches independent of each other, wherein one switch is provided for monitoring an extended condition and the other switch is provided for monitoring a retracted condition of the locking piston.

It furthermore is advantageous when the device comprises at least two independent switches for monitoring a retracted condition of the locking piston and at least two independent switches for monitoring an extended condition of the locking piston. It thereby is possible to execute an emergency extension by separate signals of the switches independent of each other. In the optimal case, an electric motor comprises a second coil as well as a separate electric cabling and hence builds up a completely redundant signaling circuit.

According to a further development of the invention, the device furthermore comprises a temperature sensor which is integrated into windings of the electric motor, in order to measure a motor temperature. It thereby is possible to switch off said motor upon detection of a motor temperature deviating from a standard range and to inhibit a retracting or extending function of the landing gear, before too high a temperature of the motor can lead to damages.

BRIEF DESCRIPTION OF THE INVENTION

Figure 2:
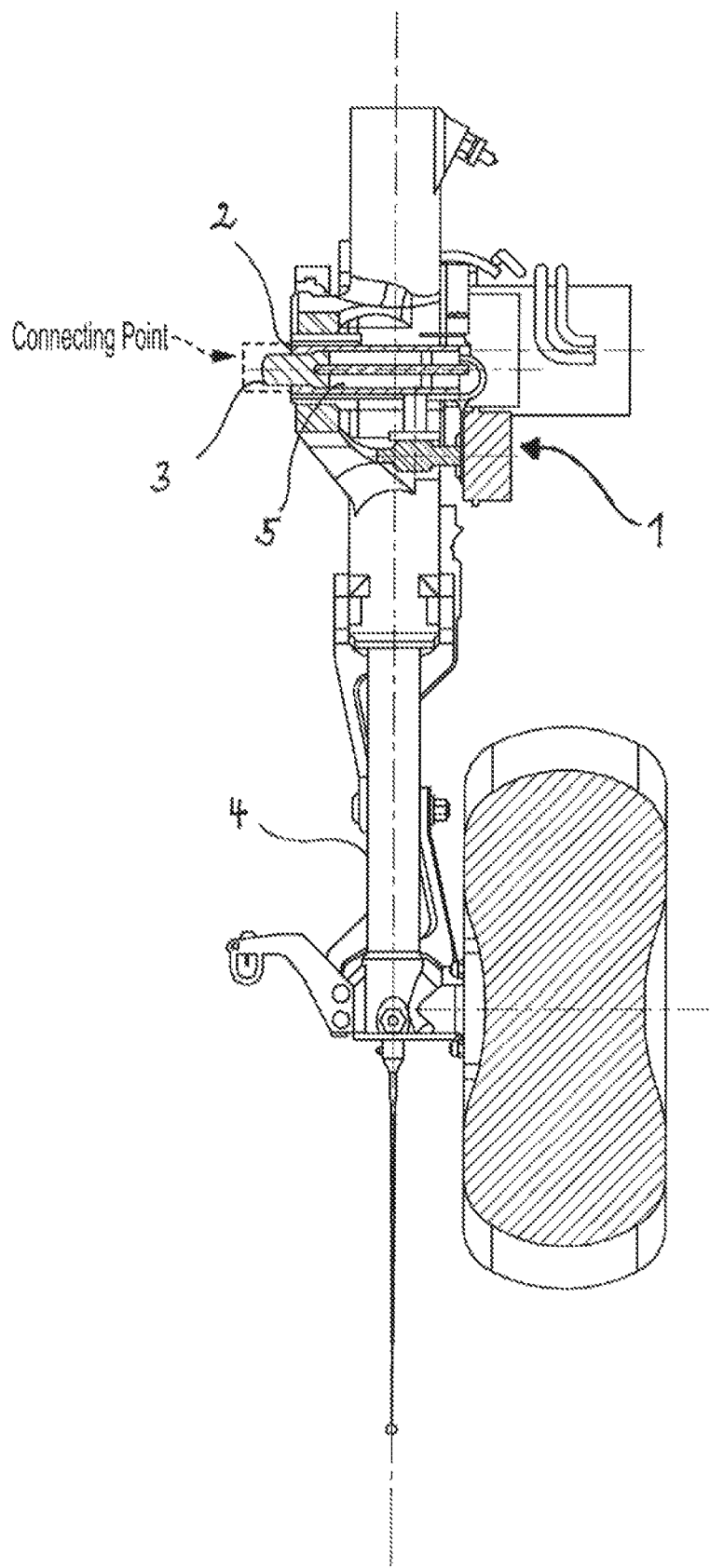
Figure 3:
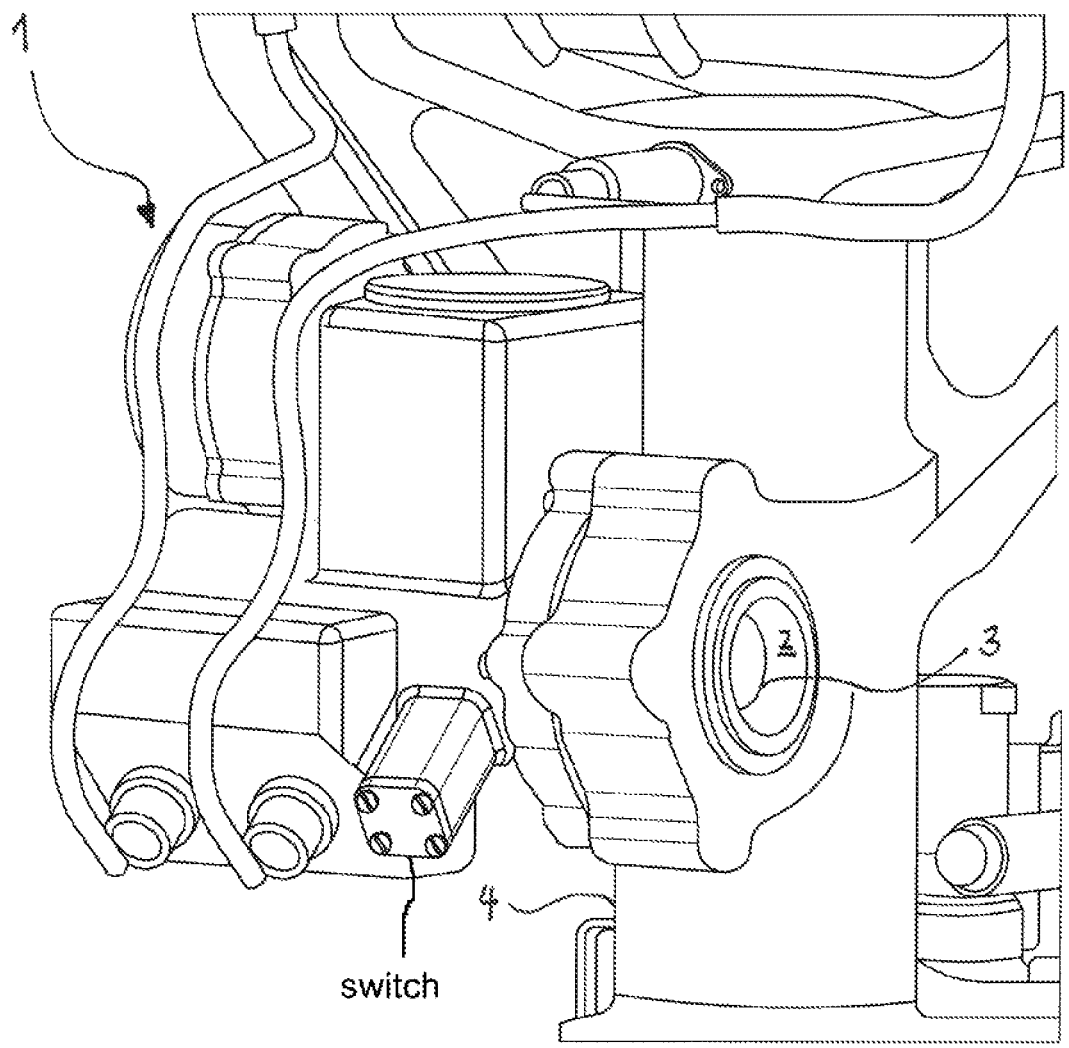
Figure 4:
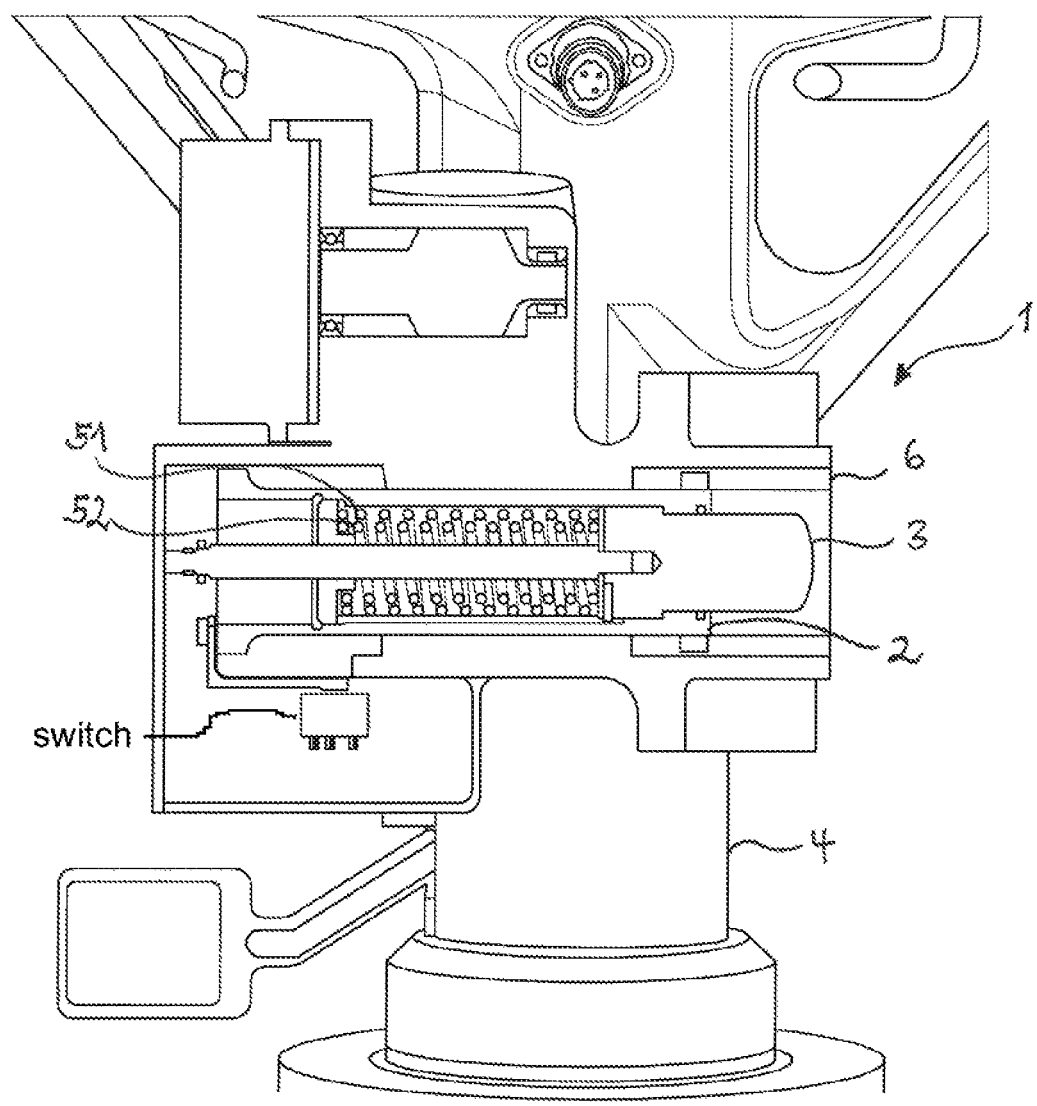

In the following, further particulars and details will be set forth with reference to drawings which represent exemplary embodiments of the invention, in which:

FIG. 1 shows a schematic diagram of an unlocked locking device of an aircraft landing gear, FIG. 2 shows a schematic diagram of a locked locking device of an aircraft landing gear, FIG. 3 shows a perspective representation of a locking device of an aircraft landing ear according to the invention, and FIG. 4 shows a sectional view of the locking device according to the invention.

DETAILED DESCRIPTION

FIG. 1 shows an aircraft landing gear with the locking device according to the invention. There is shown a tire 6 which is connected with an aircraft main body (not shown) by a landing gear leg 4. The landing gear leg 4 consists of a rigid element 42 firmly connected with the aircraft main body, which partly encloses a resilient element 41. It can also be seen that the locking unit 1 is arranged on the rigid element 42 of the landing gear leg 4. It can be seen that the locking cylinder 2 supports a locking bolt 3 in itself, which via a spring 5 is pretensioned such that the locking bolt 3 is urged out of the locking cylinder 2. With reference to dashed orientation lines it can also be recognized that the locking bolt 3 and the locking cylinder 2 are arranged approximately transversely to the longitudinal direction of the landing gear leg 4. However, other orientations of the locking bolt 3 and of the locking cylinder 2 relative to the longitudinal direction of the landing gear leg 4 also are conceivable. They need not necessarily be transverse to each other. In addition, the locking unit 1 is shown in a condition in which the locking unit 1 is in an unlocked condition. The locking bolt 3 hence is in a retracted condition.

In the condition shown in FIG. 1, the landing gear leg can be retracted or extended, as the locking bolt 3 completely is in the locking cylinder 2. To be able to change between an extended and a retracted condition, a motor 5 is provided. Typically, a transmission is arranged between the sleeve 2 and the motor.

FIG. 2 shows the locking unit 1 in a locked condition. It can be seen that the locking bolt 3 protrudes out of the locking cylinder 2. In this condition it typically engages into a connecting point (not shown), which renders a retraction or extension of the landing gear leg 4 impossible. In such a looked condition a total movement of the landing gear leg 4 accordingly no longer is possible. In a completely retracted or a completely extended condition the movement is inhibited by engagement into a corresponding connecting point. In a retracted condition a sleeve tor example is imaginable, which is firmly connected with the aircraft main unit and upon engagement of the locking bolt 3 inhibits an extension movement of the landing gear leg 4. In an extended condition, on the other hand, the landing gear bolt 3 engages into a corresponding counterpart which prevents a retraction of the landing gear leg 4.

Providing a drag brace, which inhibits an unwanted retraction or an unwanted movement in retracting direction, thereby is superfluous. In addition, the uplock mechanism, which retains the landing gear leg 4 in its landing gear well, no longer is required either.

In general, a saving on weight or the reduction of components is achieved, which leads to a better efficiency of an aircraft landing gear.

FIG. 3 shows a perspective representation of the locking device according to the invention. It can be seen that the locking bolt 3 rests in the locking cylinder 2 in the retracted condition. In such a condition, pivoting of the landing gear leg 4 out of the aircraft main body into an extended condition or retracting the landing gear leg 4 into the aircraft main body hence is possible.

FIG. 4 shows a sectional view of the locking device according to the invention. There can again be seen the arrangement of locking cylinder 2 and locking bolt 3 extending substantially transversely to the longitudinal direction of the landing gear leg 4. It should again be noted that an orientation transversely to the landing gear leg is not absolutely necessary, but also can adopt other orientations. There can also be seen the redundant design of the springs 51, 52, which urge the locking bolt 3 in a direction out of the locking cylinder 2. By means of an electric motor, the locking bolt 3 is moved into the locking cylinder 2. Reference numeral 6 designates the guide bushing.

By providing the locking device according to the invention it no longer is necessary to provide a drag brace and an uplock in a landing gear for an aircraft. At the same time, the positioning of the locking device on the landing gear leg 4 reduces the number of necessary components and reduces the installation space necessary therefor.

The invention claimed is:
1. An aircraft landing gear locking device, comprising:
   a landing gear leg which is elongated in a longitudinal direction and which is pivotally rotatable between a retracted and an extended position;
   a locking cylinder arranged on the landing gear leg;

a locking bolt arranged in the locking cylinder and moveable in a direction transverse to the longitudinal direction between a locked position, where a first end of the locking bolt extends outside of the locking cylinder, and an unlocked position, where the first end of the locking bolt is fully withdrawn into the locking cylinder;

a first connection point which is engaged by the locking bolt when the landing gear leg is in the retracted position and the locking bolt is in the locked position so as to lock the landing gear leg in the retracted position; and a second connection point which is engaged by the locking bolt when the landing gear leg is in the extended position and the locking bolt is in the locked position so as to lock the landing gear leg in the extended position.

2. The locking device according to claim 1, wherein the locking bolt is pretensioned by at least one spring to move from the unlocked position to the locked position.

3. The locking device according to claim 1, wherein the locking bolt is pretensioned by at least two independent springs to move from the unlocked position to the locked position.

4. The locking device according to claim 1, furthermore comprising an electric motor for moving the locking bolt in the locking cylinder.

5. The locking device according to claim 1, furthermore comprising at least one sensor configured to monitor a position of the locking bolt relative to the locking cylinder.

6. The locking device according to claim 5, wherein the at least one sensor comprises a first sensor configured to monitor whether the locking bolt is in the retracted position and a second sensor which is separate from the first sensor and which is configured to monitor whether the locking bolt is in the extended position.

7. The locking device according to claim 5, wherein the at least one sensor comprises first and second independent sensors configured to monitor whether the locking bolt is in the retracted position and a third and fourth independent sensors configured to monitor whether the locking bolt is in the extended position.

8. A nose or tailwheel landing gear, which comprises a locking device according to claim 1.

9. An aircraft with a locking device for the landing gear according to claim 1.

10. The locking device according to claim 1, wherein the first and second connection points are sleeves that receive the first end of the locking bolt when the locking bolt is in the locked position.

* * * * *